United States Patent Office.

N. A. FRANK, OF CHICAGO, ILLINOIS.

Letters Patent No. 79,337, dated June 30, 1868.

IMPROVED COMPOSITION FOR KALSOMINING WALLS, &c.

*The Schedule referred to in these Letters Patent and making part of the same.*

TO ALL WHOM IT MAY CONCERN:

Be it known that I, N. A. FRANK, of Chicago, in the county of Cook, and State of Illinois, have invented a new and useful Improvement in Kalsomine; and I do hereby declare that the following is a full, clear, and exact description thereof, reference being had to the following-described ingredients of which my kalsomine is composed Four quarts of Paris white, one-fourth pound of white zinc, and one-half pound of white glue are the ingredients, and about the proportions used in preparing ordinary kalsomine.

The method of compounding consists simply in dissolving the glue in about two gallons of warm water, and then incorporating in this the zinc and Paris white, when the kalsomine is ready for use, with the addition of water to thin with.

The objections to kalsomine prepared in this manner, and of the materials named, consist, first, in the difficulty with which it is spread on the wall, thereby involving much labor, the wearing of brushes, and frequently resulting in an indifferent quality of finish; second, this is mostly caused by the sticky character of the glue, and partly by the material used for plastering the wall, and as a consequence several persons are required to work on a room of any considerable size at the same time, in order to properly finish it.

It is the object of the present invention to obviate the above-named difficulties, at a cost so small as to be merely nominal, as regards the material, and at the same time provide a kalsomine which will give a much better finish and be more durable.

I use, in addition to the kalsomine above described, the following ingredients, tallow, lye, whiting, plaster Paris, and glycerine, and compound them as follows:

I take ten pounds of tallow, five pounds of lye, twelve degrees strong, and put them in any suitable vessel, and boil them one hour; then add five pounds of lye, same strength, and boil until saponified, which will take about half an hour; then add fifteen gallons of water and ten pounds of lye, and boil again for three-quarters of an hour. I then put the compound in a soft-wood barrel, or other suitable vessel, and incorporate in seven pounds of whiting the fourth of a pound of glycerine and one-half pound of plaster Paris, and stir thoroughly for three-fourths of an hour, after which the compound can be put by for use.

In order to use the invention, one pound of the mixture should be dissolved in a pint of hot water, and then added to the ordinary kalsomine first named, and the compound so mixed can be as readily applied to a wall as oil paint, and no difficulty will be experienced in making laps, consequently one person can finish a room, where, when the ordinary kalsomining is used, two or more are required; and further, a very superior finish is secured, and one which is glossy and durable.

When only an ordinary finish is desired, the zinc may be omitted, and yet the kalsomine will be durable, and equally as good as that now in use with it, but I prefer, for good work, to use the compound as described.

Neither is it essential that the given proportions be strictly adhered to, as they may be varied, and not materially affect the result.

Having thus described my invention, what I claim, and desire to secure by Letters Patent of the United States, is—

A kalsomine, composed of the ingredients herein named, and compounded substantially as specified.

N. A. FRANK.

Witnesses:
G. L. CHAPIN,
A. HAYWARD.